US006262802B1

(12) United States Patent
Kiyono

(10) Patent No.: US 6,262,802 B1
(45) Date of Patent: *Jul. 17, 2001

(54) SCALE FOR SENSING MOVING OBJECT, AND APPARATUS FOR SENSING MOVING OBJECT USING SAME

(76) Inventor: Satoshi Kiyono, 2-35-403, 1-chome Katahira Aoba-ku, Sendai-shi, Miyagi-ken (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/866,424

(22) Filed: May 30, 1997

(30) Foreign Application Priority Data

Jul. 29, 1996 (JP) ................................... 8-199115

(51) Int. Cl.[7] .................................... G01B 11/14
(52) U.S. Cl. ...................... 356/375; 33/707; 250/237 G; 250/306; 250/307
(58) Field of Search ................................. 356/394, 395, 356/396, 397, 375, 376, 138, 373; 250/237 G, 306, 307; 33/706, 707

(56) References Cited

U.S. PATENT DOCUMENTS

| | | | |
|---|---|---|---|
| 2,484,103 | * 10/1949 | Lewis | 356/396 |
| 3,055,263 | * 9/1962 | Kuehne | 356/396 |
| 3,502,415 | * 3/1970 | Hock | 356/396 |
| 3,791,742 | * 2/1974 | Grey et al. | 356/396 |
| 3,833,807 | * 9/1974 | Takeda | 356/395 |
| 3,936,195 | * 2/1976 | Roesch | 356/396 |
| 4,879,555 | * 11/1989 | Ichikawa et al. | 356/375 |
| 5,088,209 | * 2/1992 | Lummes et al. | 33/706 |
| 5,589,686 | * 12/1996 | Ohara | 250/306 |
| 5,744,799 | * 4/1998 | Ohara | 250/306 |

FOREIGN PATENT DOCUMENTS

| | | |
|---|---|---|
| 0 359 414 | 3/1990 | (EP). |
| 1 412 638 | 11/1975 | (GB). |
| 88/00332 | 1/1988 | (WO). |
| 96/08727 | 3/1996 | (WO). |

OTHER PUBLICATIONS

Search Report under Section 17 dated Nov. 24, 1997 for U.K. Patent Application No. GB 9715927.1, which corresponds to U.S. Application No. 08/866,424.

Letter dated Nov. 2, 1998 and Further Search Report under Section 17 dated Oct. 30, 1998 for U.K. Patent Application No. GB 9715927.1, which corresponds to U.S. Application No. 08/866,424.

Examination Report under Section 18(3) dated Nov. 4, 1998 for U.K. Patent Application No. GB 9715927.1, which corresponds to U.S. Application No. 08/866,424.

* cited by examiner

*Primary Examiner*—Hoa Q. Pham
(74) *Attorney, Agent, or Firm*—Ladas & Parry

(57) ABSTRACT

Provided is an apparatus for accurately sensing the position of a moving object in two dimensions as well as a change in the attitude of the object when the object is moving. The apparatus includes a scale and at least one angle sensor. The scale is constituted by an angular grid, which is formed on the surface of a scale substrate inclusive of a planar surface and freely curved surface thereof, and which has an angle-related property that varies in two different directions (the x and y directions) in the form of a known function. The angle sensor is arranged so as to confront the angular grid surface of the scale. Either the scale or the angle sensor is mounted on a moving object and the position of the moving object in two-dimensional coordinates is sensed during relative movement between the scale and the angle sensor.

55 Claims, 4 Drawing Sheets

Generating line

SCALE FOR SENSING MOVING OBJECT, AND APPARATUS FOR SENSING MOVING OBJECT USING SAME

BACKGROUND OF THE INVENTION

1. Field of the Invention

This invention relates to a scale ideal for sensing the position and attitude of a moving object, as well as an apparatus for sensing a moving object by making use of this scale. More particularly, the invention relates to a sensing apparatus in which a scale is constituted by an angular grid which varies in two different directions in accordance with a known function, the angular grid being combined with an angle sensor, which moves relative to the surface of the angular grid, to thereby enable precise detection of the position and attitude of a moving object.

2. Description of the Related Art

When the position of a moving object such an XY table or cutter is sensed in a machine tool or the like, a measurement device such as a rotary encoder or linear encoder is necessary for each degree of freedom. When two-dimensional positioning is performed, for example, stages capable of being positioned along respective ones of x and y axes are stacked one above the other and a measurement device is provided for each stage to achieve positioning. Alternatively, a measurement device comprising a combination of a circumferential scale and a single-axis stage is used to measure rotational position and radial position independently to effect positioning.

In a situation where position is determined in x and y directions using a laser interference-type displacement meter, position is sensed by a combination of two displacement meters and a device such as a highly precise straight edge the accuracy of the shape whereof is assured over a range of movement at right angles to the direction in which displacement is sensed.

Further, in cases where attitude corresponding to pitching and yawing of a moving object is sensed in the prior art, use is made of an autocollimator. Though an autocollimator is capable of measuring pitching and yawing simultaneously with respect to linear movement along one axis, a high-precision straight edge is needed for detection of an object moving along the two x and y axes.

Furthermore, though a leveling instrument is known as means for measuring the rolling of a moving object, problems arise in terms of speed of response and measurement accuracy and therefore a leveling instrument is not suitable for use as highly precise measurement equipment.

Accordingly, the state of the art is such that two parallel straight edges are deployed and rolling angle is calculated from the difference between distances measured up to the straight edges, or such that rolling angle is sensed by an autocollimator using a single straight edge as a reference mirror surface.

However, a measurement device such as the rotary encoder or linear encoder used in the conventional sensing apparatus described above is capable of performing positioning in one dimension only. At least two sets of the above-mentioned measurement apparatus are required to be combined for two-dimensional positioning, a fact that represents a major limitation when designing an apparatus for sensing moving objects.

Further, in a situation where positioning is performed using the laser interference-type displacement meter, essentially only one-dimensional positioning is possible. If positioning in two dimensions is to be carried out, the highly precise straight edge is required. As a result, in a scenario where a machine tool or the like is provided with this type of apparatus for sensing moving objects, problems arise in terms of manufacturing limitations and higher cost.

With the prior-art sensing apparatus, the encoder which determines position and the measurement circuitry which senses a change in attitude are separately arranged. Consequently, a sensing apparatus capable of sensing the two-dimensional position, pitching, rolling and yawing of a moving object would be complex and high in cost.

With means such a photoelectric linear scale, a high degree of positional accuracy is required to correctly place the scale and the device that reads it. This makes it difficult to deploy a plurality of reading devices in an effort to enlarge the range of measurement beyond the length of the scale. The end result is that a long scale is required in order to sense movement along a long range of movement.

SUMMARY OF THE INVENTION

The present invention has been devised in view of the foregoing circumstances and its object is to provide a scale for sensing a moving object as well as an apparatus for sensing a moving object by using the scale, wherein the scale and apparatus make it possible to sense, in highly precise fashion, the position of a moving object in two dimensions as well as a change in the attitude of the object when the object moves.

According to the present invention, the foregoing object is attained by providing a scale for sensing at least one of position and various attitudes of a moving object, the scale being formed from an angular grid, which is formed on or in a surface of a scale substrate inclusive of a planar surface and freely curved surface thereof, and which has an angle-related property that varies in two different directions in the form of known function.

The angular grid comprises a multiplicity of peaks and valleys of a fixed amplitude wherein the angle-related property varies sinusoidally in two intersecting directions on or in the surface of the substrate.

The angular grid is so adapted as to apply electromagnetic power to an electro-optic crystal or a liquid that fills the interior of a vessel and reacts to electromagnetic force or light, thereby subjecting the electro-optic crystal or liquid to a change in refractive index, wherein the change is in the form of a known function.

The angular grid constructs orthogonal coordinates, cylindrical coordinates, polar coordinates or coordinates along a freely curved surface.

According to the present invention, the foregoing object is attained by providing a sensing apparatus for sensing position of a moving object, comprising a scale constituted by an angular grid, which is formed on or in a surface of a scale substrate inclusive of a planar surface and freely curved surface thereof, and which has an angle-related property that varies in two different directions (x and y directions) in the form of a known function, and at least one two-dimensional angle sensor disposed to confront the angle-grid side of the scale, one of the scale and angle sensor being attached to a moving object and the position of the moving object in two-dimensional coordinates being detected in relative movement between the scale and the angle sensor.

In another aspect of the present invention, the foregoing object is attained by providing a sensing apparatus for sensing position and various attitudes of a moving object, comprising a scale constituted by an angular grid, which is formed on or in a surface of a scale substrate inclusive of a planar surface and freely curved surface thereof, and which has an angle-related property that varies in two different directions (x and y directions) in the form of a known function, and at least one pair of two-dimensional angle sensors disposed to confront the angle-grid side of the scale and spaced apart from each other by prescribed distances along the x and y directions, one of the scale and angle sensors being attached to a moving object and the position of the moving object in two-dimensional coordinates as well as pitching and rolling angle of the moving object being detected in relative movement between the scale and the angle sensor.

In another aspect of the present invention, the foregoing object is attained by providing a sensing apparatus for sensing position and various attitudes of a moving object, comprising a scale constituted by an angular grid, which is formed on or in a surface of a scale substrate inclusive of a planar surface and freely curved surface thereof, and which has an angle-related property that varies in two different directions (x and y directions) in the form of a known function, and at least three two-dimensional angle sensors disposed to oppose the angle-grid side of the scale and spaced apart from each other prescribed distances along the x and y directions, one of the scale and angle sensors being attached to a moving object and the position of the moving object in two-dimensional coordinates as well as pitching, rolling angle and yawing angle of the moving object being detected in relative movement between the scale and the angle sensor.

According to another aspect of the present invention, the foregoing object is attained by providing a sensing apparatus for sensing one of position or various attitudes of a moving object, comprising a scale constituted by an angular grid, which is formed on or in a surface of a scale substrate inclusive of a planar surface and freely curved surface thereof, and which has an angle-related property that varies along one axial direction (the x direction) in the form of a known function, and an angle sensor disposed to confront the angle-grid side of the scale, one of the scale and angle sensor being attached to a moving object and the position of the moving object along the one axial direction being detected in relative movement between the scale and the angle sensor.

According to the present invention, the position of a moving object along one axial direction (direction of movement) and pitching angle of the moving object are sensed by a two-point method, which relates to an angularly shaped function, from angle of inclination along the one axial direction of the above-described angular grid sensed by a pair of angle sensors arranged with a prescribed distance between them along the one-axial direction of the angular grid.

According to the present invention, the above-described angle sensor comprises a two-dimensional angle sensor for sensing a variation along one axial direction (direction of movement) and a variation along a direction at right angles to the direction of movement, wherein position along the one axial direction as well as pitching angle and rolling angle is sensed by this two-dimensional angle sensor.

According to the present invention, angular variation of the angular grid is implemented in a form obtained by superimposing a plurality of sine waves having different frequencies.

According to the present invention, the angle sensor comprises a plurality of displacement meters arrayed with a prescribed spacing among them, wherein the displacement meters are of optical type, of a type which senses an electro-optic quantity or of mechanical-contact type, a differential output from two mutually adjacent displacement meters serving as the output of the angle sensor.

According to the present invention, the angle sensor is made to function as a distance sensor by applying a rotational angle of a known direction and known magnitude to the angle sensor, and distance between the angular grid surface of the scale and the angle sensor, or amount of change in the distance, is capable of being sensed in relative movement between the angular grid and the angle sensor.

According to the present invention, the scale is constructed by causing an angular grid surface, whose angle-related property varies in the form of a well-known function, to be produced by standing waves obtained when periodic oscillation is applied to a resilient plate, a planar surface or curved surface having a resilient property, a crystal body, a liquid surface or a liquid filling a hermetically sealed vessel, wherein the angular grid is produced on or in the surface.

According to the present invention, the scale comprises a plurality of divided scales each having an angular grid surface, and a plurality of the divided scales are arrayed intermittently or continuously in conformity with an area over which the moving object moves.

According to the present invention, traveling waves are generated, an angular grid, in the surface of which an angular change is produced by the traveling waves, is formed and position in two dimensions is determined based upon a relationship between the angular grid and time.

According to the present invention, the sensing apparatus further comprises means for correcting, based upon results of calibrating an error in the angular shape of the angular grid, results of measuring coordinate position and attitude angle by the angular grid.

According to the present invention, the sensing apparatus further comprises means for applying a fixed amount of relative motion to the angle sensor along the x and y directions of the angular grid, and calculating data for calibrating error from the known ideal shape of the angular grid based upon each detection value from the angle sensor before and after relative movement and the difference between the values, and storage means for storing the calibration data calculated.

In the present invention constructed as set forth above, the scale is formed from a two-dimensional angular grid representing an angular shape. As a result, the two-dimensional position of a moving object can be sensed as a matter of course, and so can the pitching angle, rolling angle and yawing angle of the moving object, merely by combining angle sensors with a simple scale. In addition, by adopting the angular grid as the scale, it is possible to sense position relating to two-dimensional coordinates such as orthogonal coordinates, cylindrical coordinates, polar coordinates or coordinates along a freely curved surface.

In the apparatus for sensing a moving object according to the present invention, combining at least one two-dimensional angle sensor with a scale comprising a two-dimensional angular grid makes it possible to sense the position of a moving object in two-dimensional coordinates in relative movement between the scale and the angle sensor. By subjecting the angle sensor to a known prescribed change in angle, the distance between the scale and angle sensor can also be sensed.

In the apparatus for sensing a moving object according to the present invention, combining at least one two-dimensional angle sensors with a scale comprising a two-dimensional angular grid makes it possible to sense the position of a moving object in two-dimensional coordinates, as well as the pitching and rolling angles of the moving object, in relative movement between the scale and the angle sensors. By subjecting the angle sensor to a known prescribed change in angle, the distance between the scale and angle sensors can also be sensed.

In the apparatus for sensing a moving object according to the present invention, combining at least three two-dimensional angle sensors with a scale comprising a two-dimensional angular grid makes it possible to sense the position of a moving object in two-dimensional coordinates, as well as the pitching, rolling and yawing angles of the moving object, in relative movement between the scale and the angle sensors. In addition, if the angle sensors are subjected to a known change in attitude, such as a change in pitching angle or rolling angle, the distance between the scale and angle sensors can also be sensed at the same time.

In the apparatus for sensing a moving object according to the present invention, position along one axis, pitching angle and rolling angle can be sensed by combining at least one pair of angle sensors with a scale constructed from an angular grid which varies along one axis (the x axis) in the form of a known function.

In the present invention, an arrangement is adopted in which the angular variation of the angular grid has a form obtained by superimposing a plurality of sine waves having different frequencies. As a result, when, by way of example, a sinusoidal angular variation one period of which is the full length of the angular grid surface in the x direction and the angular change of a sine wave having a frequency which is M times that of the first-mentioned angular change are superposed to form one angular grid, the output of an angle sensor at a certain position will include two frequency components of the angular grid surface if a constant oscillation is applied to this angle sensor in the x direction at an amplitude larger than the period of a high frequency. Since the low-frequency component gives an angular grid component in which the full length is one period, the position of the angle sensor with respect to the full length is sensed from this angular grid component. Since the high-frequency component gives an angular grid component of a high frequency, it is possible to sense position precisely from this angular grid component. It is possible to select a component in which the angular shape varies linearly or a component in which the differential of the angular shape varies linearly. Furthermore, if the origin is provided on the angular grid surface, movement of the angle sensor after restoration to the origin will give the absolute coordinates from the origin.

Further, in the present invention, the angle sensor comprises a plurality of displacement meters arrayed with a prescribed spacing among them, wherein the displacement meters are of optical type, of a type which senses an electro-optic quantity or of mechanical-contact type. By sensing a change in the angle of inclination of the shape of the angular grid surface, which change has been applied by a differential output from the displacement meters in the form of a change in height and shape, this sensed change can be utilized instead of angle information. If two displacement meters arrayed in each of the x and y directions, for a total of four displacement meters, or three displacement vectors arrayed at the apices of a triangle are arranged with prescribed distances between them, the displacement meters will function as a two-dimensional angle sensor.

Further, in the present invention, the scale is capable of forming an angular grid surface, whose angle-related property varies spatially, by standing waves obtained when periodic oscillation is applied to a resilient plate, a planar surface or curved surface having a resilient property, a crystal body, a liquid surface of a liquid filling a hermetically sealed vessel, wherein the angular grid is produced on or in the surface. The scale can be utilized as the angular grid surface only while the oscillation is being applied.

Further, in the present invention, in accordance with the present invention, the scale is constructed from a plurality of divided scales each having an angular grid surface, wherein a plurality of the divided scales or angle sensors which read the scale are arrayed intermittently or continuously in conformity with the area over which the moving object moves. As a result, even if an angle sensor departs, in relative terms, from one angular grid surface, information indicative of the position of the angular grid surface can be sensed by the adjacent divided scale or angle sensor. This makes it possible to enlarge the range of relative movement between the angle sensor and the angular grid.

Further, in the present invention, correction means is provided for correcting, based upon results of calibrating and error in the angular shape of the angular grid, results of measuring coordinate position and attitude angles by the angular grid. Accordingly, in situations where the angular grid cannot be fabricated to a high precision, the calibration data is stored in memory beforehand and data between known items of data is approximated by interpolation, thereby making it possible to correct measurement data based upon results of calibration.

Further, in the present invention, a fixed amount of known relative motion is applied to an angle sensor in the x and y directions of the angular grid, and data for calibrating deviation from a known ideal shape of the angular grid, based upon each detection value from the angle sensor before and after relative movement and the difference between these values, can be obtained autonomously.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the accompanying drawings.

Figure 1:
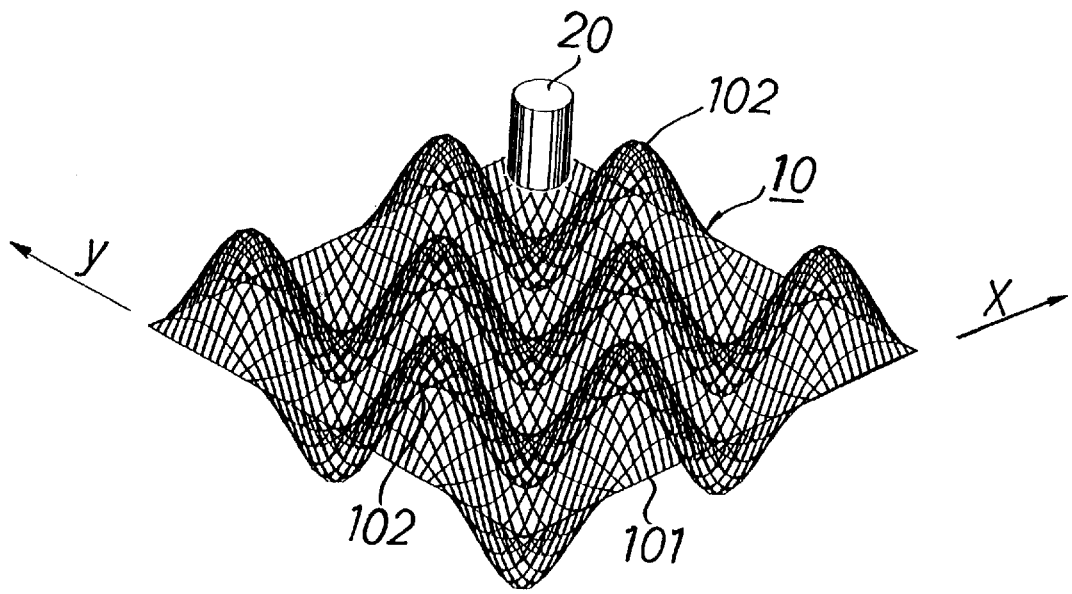
FIG. 1 is a fundamental structural view illustrating dispositional relationship in a case where a sensing apparatus according to a first embodiment of the present invention is constituted by a scale and one two-dimensional angle sensor.

FIG. 1 is a fundamental structural view illustrating dispositional relationship in a case where a sensing apparatus according to a first embodiment of the present invention is constituted by a scale and one two-dimensional angle sensor.

A scale is constituted by a waveform the height of which varies periodically, and an angle sensor is assumed to be an optical sensor for sensing the angle of inclination of the inclined surface of the scale. Further, it is assumed that the function of angular variation is such that inclinations in the x and y directions are represented by f(x,y) and g(x,y), respectively.

Shown in FIG. 1 are a scale 10 disposed on a stationary side and an angle sensor 20 provided on a sensor mount disposed on a moving side, not shown.

An angular grid 102 is formed on the planar surface of a substrate 101 constructing the scale 10. The angular grid 102 comprises a collection of sinusoidal peaks and valleys which vary in two perpendicularly intersecting directions (x and y directions) on the planar surface in the form of a known function. The angular grid 102 constructs a scale for sensing position in two directions.

The single angle sensor 20 is disposed on the side of the scale 10 at which it confronts the angular grid 102, is spaced a prescribed distance away from the angular grid surface and is capable of translational movement. The angle sensor 20 irradiates the angular grid 102 with emitted light rays and senses, along the x and y axes, the direction of light reflected from the angular grid 102. The position of a moving object in two-dimensional coordinates when the angle sensor 20 has been moved relative to the scale 10 along the x and y axes is sensed.

For example, sine waves obtained when periods in two perpendicularly intersecting directions, namely x and y directions, of the angular grid 102 are represented by Tx, Ty and amplitudes are represented by a, b are as follows:

$$f(x,y)=a\sin(2\pi x/Tx) \quad (A)$$

$$g(x,y)=b\sin(2\pi y/Ty) \quad (B)$$

When the angle sensor 20 for sensing direction of reflection in the x and y directions is moved with respect to the plane of this two-dimensional angular grid, the angles in the two directions differ owing to the inclined surfaces of the peaks even though the height of the sensor with respect to the peaks of the angular grid 102 is the same. As a result, position in two dimensions can be determined distinctly by this difference. This makes it possible to sense the position of the moving object in two-dimensional coordinates.

Various techniques for effecting interpolation between wavelengths using a conventional interferometer can be employed to perform interpolation between the wavelengths of the individual sine waves expressed by Equations (A) and (B) above. By oscillating the angle sensor mechanically or, in the case of a photoelectric angle sensor, oscillating only the light beam, in the x and y directions only when performing interpolation between wavelengths, it is possible to obtain two signals respectively phase-shifted by Tx/4, Ty/4, namely by $\pi/2$, in the x and y directions, respectively. Of course, sensors for sensing the position phase-shifted by Tx/4, Ty/4 may be additionally provided and the two signals phase-shifted by $\pi/2$ may be sensed simultaneously.

Further, it is permissible to use an angle sensor which, by applying a technique relying upon the reading of a photoelectric scale, reduces the influence of error in scale graduation spacing by reading the average value of the positions of a plurality of scale graduations.

Figure 2:
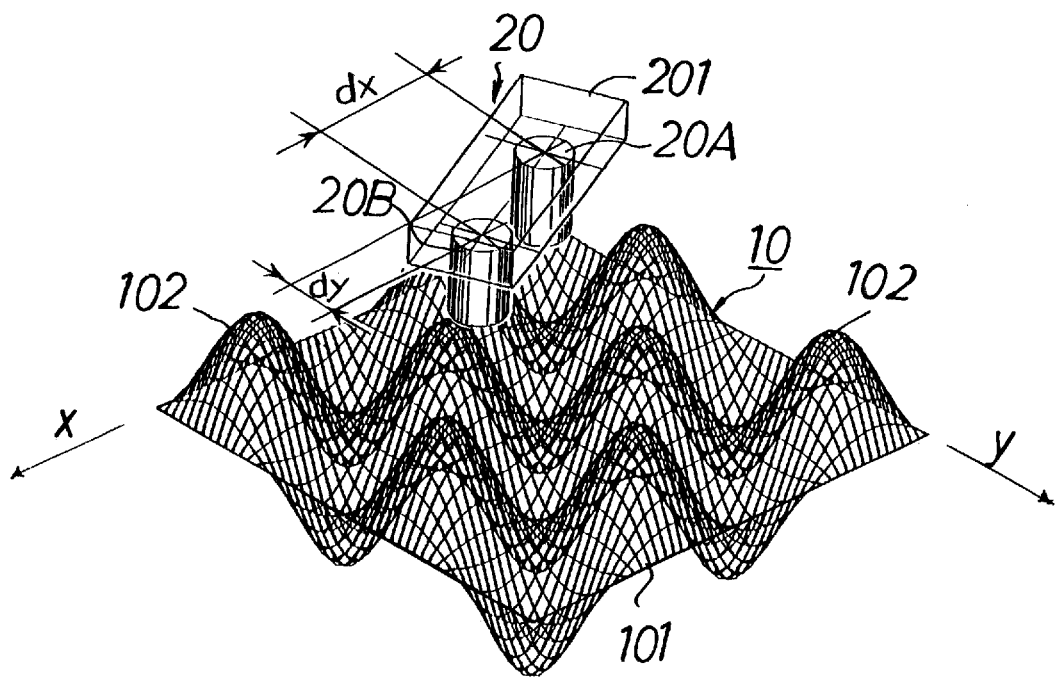
FIG. 2 is a fundamental structural view illustrating dispositional relationship in a case where a sensing apparatus according to a second embodiment of the present invention is constituted by a scale and two two-dimensional angle sensors.

FIG. 2 is a fundamental structural view illustrating dispositional relationship in a case where a sensing apparatus according to a second embodiment of the present invention is constituted by a scale and two two-dimensional angle sensors. This illustrates an instance in which position in two dimensions, pitching angle and rolling angle can be sensed.

In a manner similar to that shown in FIG. 1, the angular grid 102, which varies in two perpendicularly intersecting directions (x and y directions) on the planar surface of the substrate 101 in the form of a known function, is formed on the planar surface of the substrate 101 constructing the scale 10. Here a pair of angle sensors 20A, 20B are disposed on the side of the scale 10 at which they confront the angular grid 102 and are spaced a prescribed distance away from the angular grid surface. The angle sensors 20A, 20B irradiate the angular grid 102 with emitted light rays and sense, along the x and y axes, the direction of light reflected from the angular grid 102. The angle sensors 20A, 20B are supported on a plate-shaped sensor mount 201 which lies parallel to the plane of the angular grid and are arrayed so as to be spaced apart from each by dx, dy along x and y axes, respectively. As a result, the angle sensor 20A senses angle of inclination along the x and y axes at a position given by coordinates (x,y), and the angle sensor 20B senses angle of inclination along the x and y axes at a position given by coordinates (x+dx,y+dy).

According to the embodiment shown in FIG. 2, x-direction angle outputs ma1, ma2 of the angle sensors 20A, 20B and y-direction angle outputs mb1, mb2 of the angle sensors 20A, 20B, respectively, are given by the following equations, where pe(x,y) represents the pitching angle (inclination in the x direction) of the sensor mount and re(x,y) represents the rolling angle (inclination in the y direction) of the sensor mount:

$$ma1=f(x,y)+pe(x,y) \quad (1)$$

$$mb1=g(x,y)+re(x,y) \quad (2)$$

$$ma2=f(x+dx,y+dy)+pe(x,y) \quad (3)$$

$$mb2=g(x+dx,y+dy)+re(x,y) \quad (4)$$

From Equations (1)–(4), we have $$ma2-ma1=f(x+dx,y+dy)-f(x,y) \quad (5)$$

$$mb2-mb1=f(x+dx,y+dy)-g(x,y) \quad (6)$$

If f and g are known functions, then x and y can be determined from Equations (5) and (6).

For example, if f and g are given by the periodic functions $$f(x,y)=a\cos(2\pi x/Tx) \quad (7)$$

$$g(x,y)=b\cos(2\pi y/Ty) \quad (8)$$

then x and y can be determined from Equations (5) and (6) provided that a, b, dx, dy, Tx and Ty are known. If the number of periodic changes (the number of waves) of the output signal is counted, no problems will arise even if x and y are larger than Tx and Ty, respectively. As a result, both pitching angle pe and rolling angle re are determined by Equations (1) and (2).

It should be noted that x, y in the foregoing equations do not take into account the pitching angle pe, the rolling angle re and a disparity between the true position X,Y of the angle sensor and the sensed position x,y on the angular grid surface, which disparity is caused by a distance dz from the surface of the angular grid to the angle sensor. The relationships are given by the following equations:

$$X=x-pe(x,y)dz \quad (9)$$

$$Y=y-re(x,y)dz \quad (10)$$

Accordingly, once x, y, pe and re have been obtained, X and Y can be found using Equations (9), (10) and dz, which is known.

Furthermore, if these relations are utilized, an unknown dz can be found from relations similar to those of Equations (9) and (10) by providing the angle sensor side with a mechanism which rotates the angle sensor solely, or together with the sensor mount, through a known angle α0 or β0.

More specifically, the following equations hold, where x0, y0 represent displacements, in the x and y directions, corresponding to a change in angle sensor output caused by rotation through the angles α0, β0:

$$dz=x0/\alpha 0 \quad (11)$$

$$dz=y0/\beta 0 \quad (12)$$

Further, dz can be found by measuring the angles α0, β0 which prevail when values corresponding to the x- and y-axis displacements x0, y0 indicated in Equations (11), (12) are made fixed values, as in the manner of the intervals of scale graduations.

This doubles also as a sensor for sensing the distance between the angle sensor and the place of the angular grid.

Figure 3:
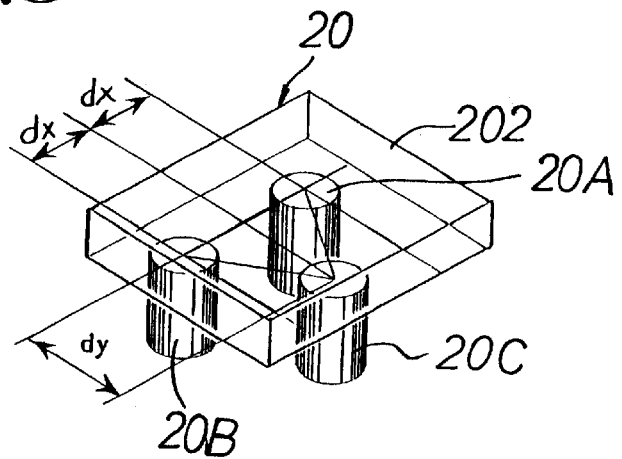
FIG. 3 is a fundamental structural view illustrating dispositional relationship in a case where a sensing apparatus according to a third embodiment of the present invention is constituted by a scale and three two-dimensional angle sensors.

FIG. 3 illustrates an instance where the sensor according to a third embodiment of the invention is constituted by three two-dimensional sensors. This illustrates a configuration capable of sensing position of a moving object in two dimensions as well as pitching angle, rolling angle and yawing angle of the moving object.

In the third embodiment, as depicted in FIG. 3, three angle sensors 20A, 20B and 20C are arranged at the apices of an isosceles triangle in the planar surface of the plate-shaped sensor mount 202 lying parallel to the angular grid surface in a manner similar to that shown in FIG. 2. Let angle sensor 20C be situated at a position (dx,−dy) along the x and y axes from the angle sensor 20, which is located at the origin, let ma3, mb3 represent the angle outputs of the angle sensor 20C along the x and y axes, and let ma2, mb2 represent the angle outputs of the angle sensor 20B along the x and y axes. If yawing angle γ, the center of rotation of which is the angle sensor 20A at the origin, is considered, the following relations are obtained:

$$ma2=f(x+dx+\gamma dy, y+dy+\gamma dx)+pe(x,y) \quad (13)$$

$$mb2=g(x+dx+\gamma dy, y+dy+\gamma dx)+re(x,y) \quad (14)$$

$$ma3=f(x+dx-\gamma dy, y-dy+\gamma dx)+pe(x,y) \quad (15)$$

$$mb3=g(x+dx-\gamma dy, y-dy+\gamma dx)+re(x,y) \quad (16)$$

When pe is known or is negligibly small, x can be determined from Equation (1) and γ can be determined from Equation (13), whereby y and re may be found using Equations (14) and (16). Conversely, after y and γ have been obtained from Equations (2) and (14), similar to a case where re is negligible or known, x and pe may be found using Equations (13) and (15).

When both pe and re are unknown and are not negligibly small, it is required that γ be obtained solely from a differential output of the angle sensors.

Since there is no loss of generality even in $$f(x,y)=f(x,y+dy)=f(x,y-dy) \quad (17)$$

$$g(x,y)=g(x+dx,y) \quad (18)$$

the following equations are obtained:

$$ma2-ma1=f(x+dx+\gamma dy,y)-f(x,y) \quad (19)$$

$$ma3-ma1=f(x+dx-\gamma dy,y)-f(x,y) \quad (20)$$

Letting γ be a minute quantity and expressing partial differentials of f, g with respect to x, y by fx, fy using the suffixes x, y, we have $$ma2-ma3=2\gamma dy fx(x+dx,y) \quad (21)$$

Since the function fx(x+dx,y) and dy are known, γ is obtained.

Similarly, we have $$mb2-mb3=\gamma dx\{gy(x,y+dy)-gy(x,y-dy)\} \quad (22)$$

and the minute quantity γ is obtained also from the angle output in the y direction. Since x, y, α and β may be found when γ has been obtained, these are recorded. If the minute quantity γ, which is a slowly varying quantity, is accumulated while γ is sequentially obtained, the final γ at the required position is obtained.

This is similar to a case where x, y vary slowly or only by a minute amount. For example, γ may be simply obtained, providing that y is known and constant, from the amount of change in the differential output given by Equation (22). Therefore, if γ is found on the assumption that the change in y once determined is small and the other quantities are decided based upon this, then it is obvious that a case in which y varies slowly or minutely can be dealt with as well.

In general, it is difficult to conceive of a situation in which all degrees of freedom vary at the same speed and by the same magnitude in precision equipment. Accordingly, if any one degree of freedom whose variation is small or slow is selected and processing similar to that in the case of γ described above is executed, then the amounts of change in all degrees of freedom, namely position relating to two-dimensional coordinates, distance from the angular grid surface to the angle sensor and pitching angle, rolling angle and yawing angle of the moving object, can be determined.

It should be noted that the angle sensors 20B and 20C may be placed on a right-angled triangle at positions (dx,o) and (o,dy) in the x and y directions or on a more general triangle.

The principle described above is applicable not only to detection of the position of a moving object but also to the repetitive resetting of the same moving object to the same desired position and attitude. Accordingly, if an arrangement is adopted in which marks predetermined on an object by a two-dimensional angular change are used to enable detection of the relative position and attitude between the object and angular sensor, then the principle of the invention can be utilized effectively in the positioning of a wafer in a semiconductor manufacturing apparatus.

Figure 4:
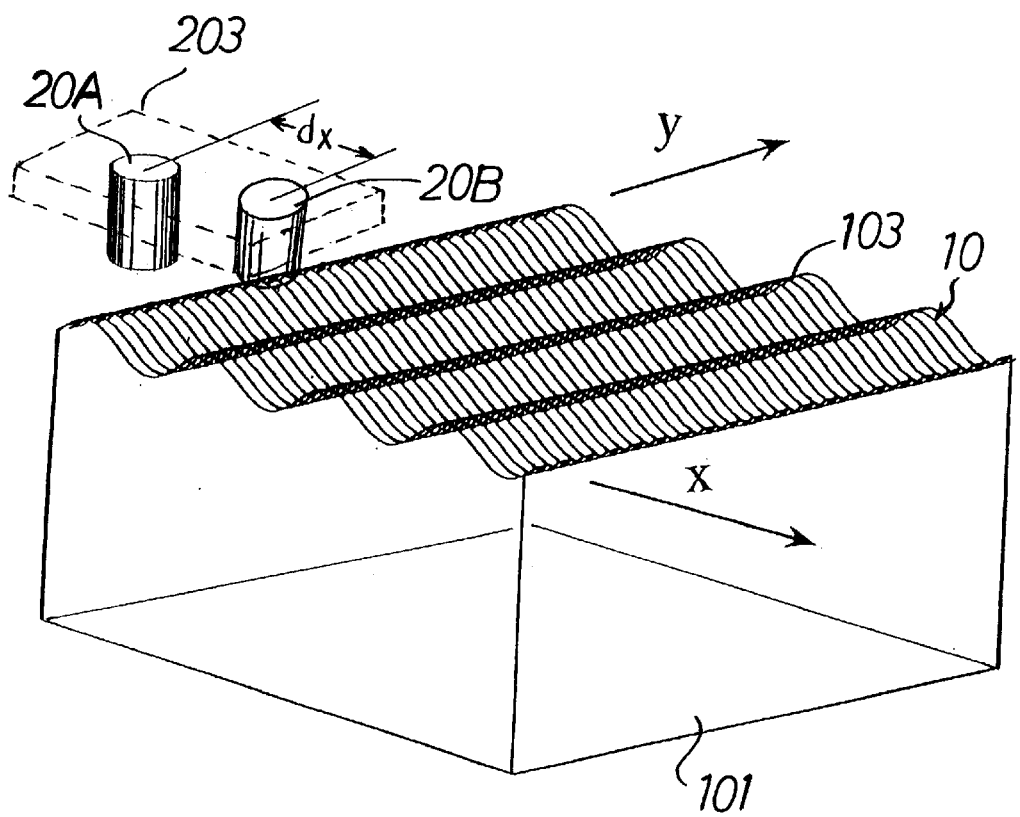
FIG. 4 is a fundamental structural view of a fourth embodiment of the invention so adapted that position along the x direction, pitching angle and rolling angle can be sensed by a planar angular grid, which applies a sinusoidal angular variation only in the x direction, and angle sensors.

FIG. 4 is a fundamental structural view of a fourth embodiment of the invention so adapted that position along the x direction, pitching angle and rolling angle can be sensed by a planar angular grid, which applies a sinusoidal angular variation only in the x direction, and angle sensors.

As shown in FIG. 4, a one-dimensional angular grid 103 the angle of which varies along the axis is formed on the planar surface of the substrate 101 constructing the scale 10. The variation in the angle of the angular grid 103 is represented by a known function f(x). Two angle sensors 20A, 20B are attached to a plate-shaped sensor mount 203 so as to arrayed along the x axis with a prescribed distance dx between them. When the angle sensors 20A and 20B are moved together with the sensor mount 203 along the x axis relative to the angular grid, position along the x axis, pitching angle and rolling angle can be sensed on the moving side.

In this embodiment, outputs m1, m2 of the two angle sensors 20A, 20B are expressed by the following equations, where pe(x) represents the pitching angle:

$$m1=f(x)+pe(x) \qquad (23)$$

$$m2=f(x+dx)+pe(x) \qquad (24)$$

If one angle sensor is used and moved in the x direction in a situation where the pitching angle is negligible, then position along the x axis can be found from the change in the output f(x).

Further, if Pe(x) is not negligible, then, taking the difference between the outputs of the two angle sensors, we obtain the following:

$$m2-m1=f(x+dx)-f(x) \qquad (25)$$

This difference between known functions is of course a known function. The x position of the angle sensor, therefore, can be determined from the change in the differential output (m2−m1). If x is known, then the pitching angle Pe(x) can be obtained, by calculation, from m1.

If the two angle sensors mentioned above are made two-dimensional angle sensors for sensing angles in both the x and y directions, then the angular shapes (where the change is ideally zero) of the scale in the x and y directions are found in the same manner as in the two-point method of the pitching angle described above. If the angle of this angled scale in the y direction thereof is known, then the rolling angle re(x) of the sensor mount, i.e. the moving object, can be sensed from the y-direction angle output of the angle sensor.

In another feasible embodiment, calibration data of the angular grid can be obtained by equipping the sensor mount of FIG. 4 with a mechanism for moving the mount infinitesimally a known amount D (not shown) in the x and y direction. In such case, let f(x) represent the ideal sinusoidal shape (the designed shape), and let e(x) represent a deviation from f(x) of the actual angular grid. Pitching due to movement of the angle sensor will be considered negligible. First x is determined utilizing the function f(x) and the angle sensor D is shifted at this position [which actually includes an unknown error δ owing to the effect of the error e(x)] by D in the x direction using a piezoelectric element or the like. Let m1, m1$_D$ represent the outputs of the angle sensor before and after the shift, respectively. The following equation is obtained from the difference between these two outputs:

$$m1_D-m1=f(x+\delta x+D)-f(x+\delta x)+e(x+\delta x+D)-e(x+\delta x) \qquad (26)$$

Making δx infinitesimally small, the following equation is obtained as an approximate derivative of e(x):

$$e'(x)=\{e(x+D)-e(x)\}/D$$

$$\approx[m1_D-m1-\{f(x+D)-f(x)\}]/D \qquad (27)$$

Since {f(x+D)−f(x)} is a known function, the right side of this equation is a known function. Accordingly, if this approximate derivative e'(x) is numerically integrated by some method, the approximate function e$_c$(x) of e(x) will be calculated.

Formula error owing to the approximation of the derivative and the numerical integration at this time is a percentage decided for every frequency and therefore can be corrected by way of Fourier transform and inverse Fourier transform.

Further, if the numerical integration is performed again after the x position evaluated by f(x) is corrected using the approximate curve ec(x) of e(x) obtained above, the accuracy of the approximate curve of e(x) obtained anew can be improved. If this correction of the x position is repeated until the correction quantity δx becomes sufficiently small, a calibration curve of the required accuracy will be obtained.

Described next will be calibration by a method of aligning two angle sensors, which are arrayed in the x direction at a spacing dx, in one row in the x direction in order to eliminate the effects of pitching when the angle sensors are moved in the x direction. The outputs m1, m2 of the two angle sensors are represented by the following equations:

$$m1(x)=f(x)+e(x)+pe(x) \qquad (28)$$

$$m2(x)=f(x+dx)+e(x+dx)+pe(x) \qquad (29)$$

where p(x) represents the pitching of the sensor at the x position.

In order to eliminate the effects of pitching, use is made of the differential output of the two sensors. The differential output is represented by the following equation:

$$m2(x)-m1(x)=\{f(x+dx)-f(x)\}+\{e(x+dx)-e(x)\}$$

$$=f1(x)+e1(x) \qquad (30)$$

where we write:

$$f1(x)=f(x+dx)-f(x) \qquad (31)$$

$$e1(x)=e(x+dx)-e(x) \qquad (32)$$

Here f1(x) is a function having the same period as that of the original angular grid in the x direction and can be regarded as the ideal function of the grid. If dx is known and the ideal shape of f(x) (the average sensitivity in terms of a displacement meter) has been ascertained, then the ideal shape of f1(x) can also be determined and this can be used to infer x.

If a configuration is adopted in which the mount having the two attached angle sensors is shifted by D along the x axis and the outputs of the angle sensors are read before and after the shift, then an approximate value of the derivative of e1(x) will be obtained as indicated by the following equation in the same manner as described above:

$$e1'(x)=\{e1(x+D)-e1(x)\}/D$$

$$\approx[m2_D(x)-m2(x)-\{m1_D(x)-m1(x)\}-\{f1(x+D)-f1(x)\}/D \qquad (33)$$

where $m1_D(x)$, $m2_D(x)$ are the outputs of the angle sensors when the sensor mount has been shifted by D at the x position.

Since $\{f1(x+D)-f1(x)\}$ is a known function, the left side of this equation is a known function. Accordingly, if this approximate derivative e1'(x) is numerically integrated by some method, the approximate function $e1_C(x)$ of e1(x) will be calculated.

Further, if the numerical integration is performed again after the x position evaluated by f1(x) is corrected (adopting δx as the correction quantity) using the approximate curve e1 c(x) of e1(x) obtained above, the accuracy of the approximate curve of e1(x) obtained anew can be improved. If this correction of the x position is repeated until the correction quantity δx becomes sufficiently small, a calibration curve of the required accuracy will be obtained.

If the final result of e1(x) is integrated one more time, e(x) is found, the angular shape of the angular grid is obtained from e(x) and position along the x axis and pitching are sensed by the two x-direction angle sensors. This completes the calibration of the angular grid.

Figure 5:
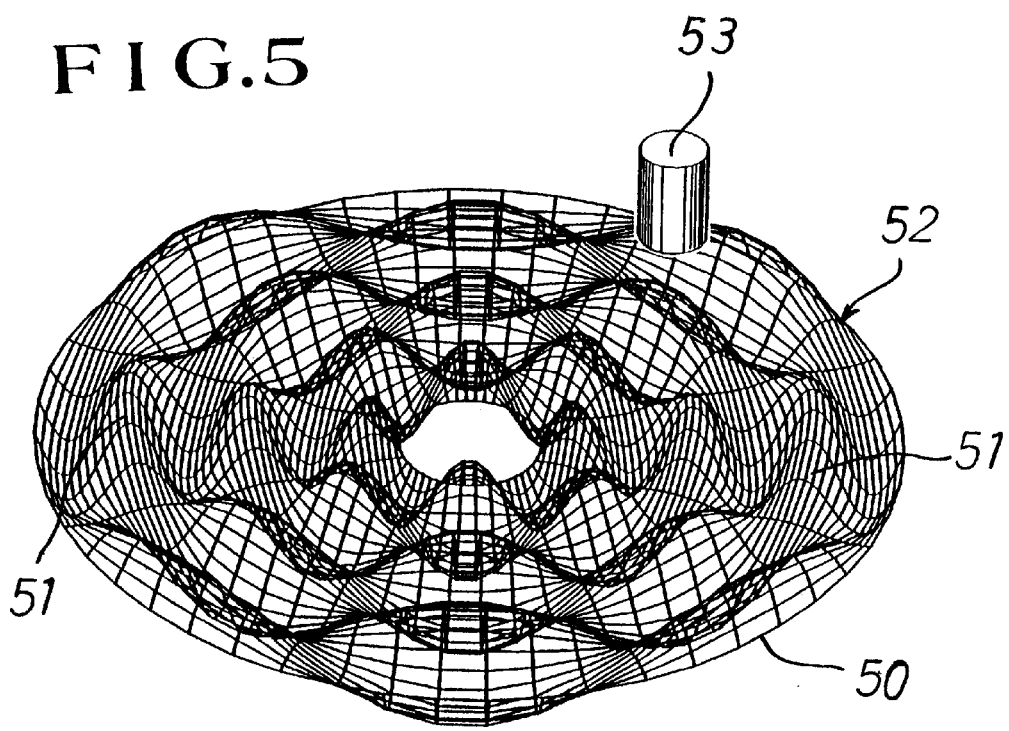
FIG. 5 is a fundamental structural view of a fifth embodiment of the invention so adapted that positioning by polar coordinates is made possible.

FIG. 5 is a fundamental structural view of a fifth embodiment of the invention so adapted that positioning by polar coordinates is made possible.

As shown in FIG. 5, a scale 52 for polar coordinates is constructed by forming a two-dimensional angular grid 51, the angle of which varies in the radial and circumferential directions in accordance with a known function, on a circular disk 50. An angle sensor 53, which moves relative to the scale 52 along the surface of the two-dimensional angular grid, is disposed so as to confront the angular grid. Positioning based upon polar coordinates is made possible by the angle sensor 53.

In the fifth embodiment, the two-dimensional angular grid 51 is not limited to that having the shape shown in FIG. 5 but may be one which provides an angular change along a spiral.

Figure 6:
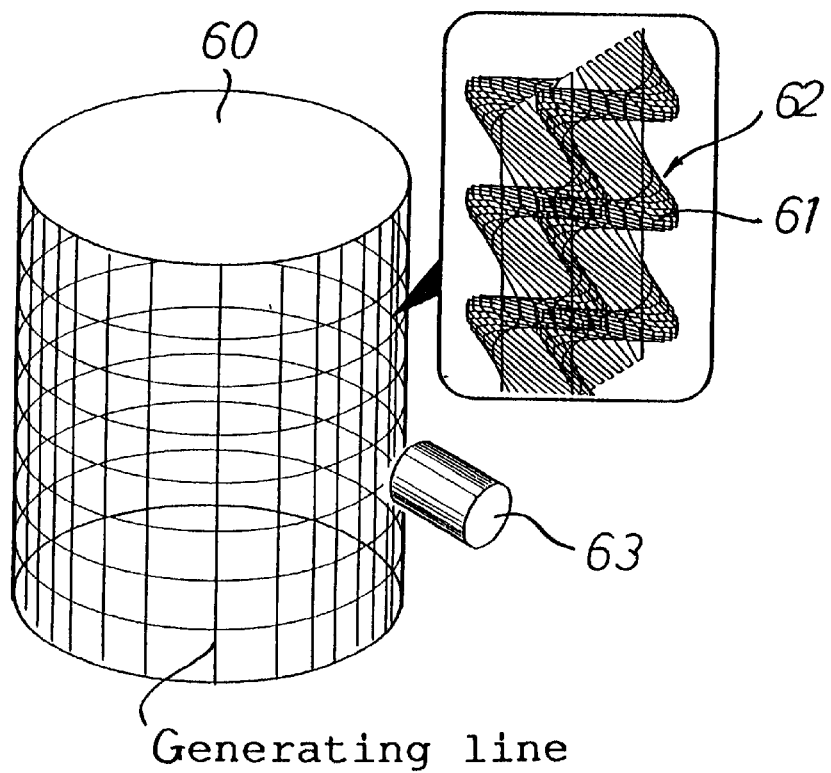
FIG. 6 is a fundamental structural view of a sixth embodiment of the invention so adapted that positioning by cylindrical coordinates is made possible.

FIG. 6 is a fundamental structural view of a sixth embodiment of the invention so adapted that positioning by spherical coordinates is made possible.

As shown in FIG. 6, a scale 61 for cylindrical coordinates is constructed by forming an angular grid 61, the angle of which varies in the direction of the generating lines on the outer circumferential surface of a cylinder 60 and in the circumferential direction orthogonal to the generating lines in accordance with a known function, on the outer circumferential surface of the cylinder 60. An angle sensor 63, which moves relative to the scale 62 along the surface of the angular grid, is disposed so as to confront the angular grid. Positioning based upon cylindrical coordinates is made possible by the angle sensor 63.

In the sixth embodiment, the two-dimensional angular grid 61 is not limited to that having the shape shown in FIG. 6 but may be one of the type in which the angular shape varies along a helix.

In the embodiments shown in FIGS. 1 through 6, the apparatus may be one separated into a light sensor and a source of light rays or the like for applying angle information to the angle sensor, with the light sensor and source being disposed on opposite sides of the angular grid so that a change in the angle of transmitted light rays or the like may be sensed. The angular grid in such a configuration may rely upon a change in refractive index or may cause a change in the direction of transmitted light by roughness on the underside of the light-transmitting plate.

Figure 7:
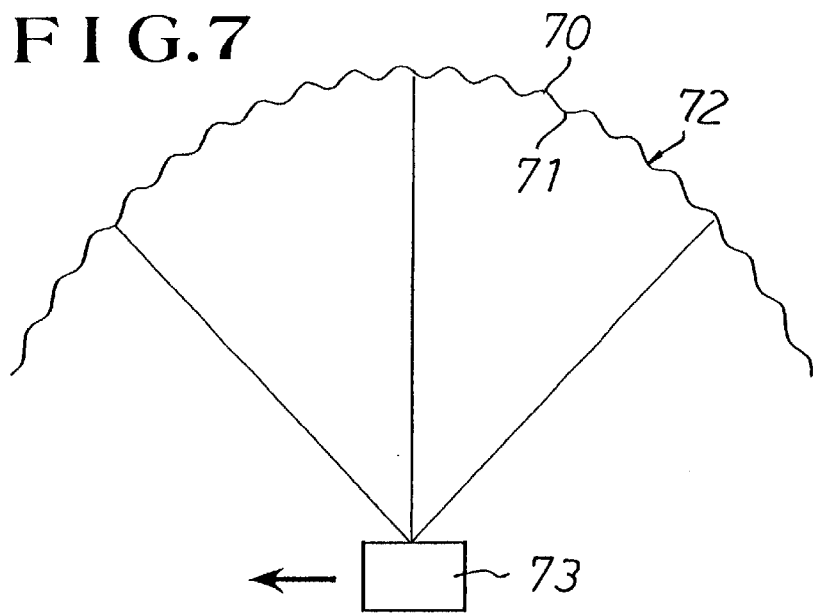
FIG. 7 is a fundamental structural view of a seventh embodiment of the invention so adapted that positioning by spherical coordinates is made possible.

FIG. 7 is a fundamental structural view of a seventh embodiment of the invention so adapted that positioning by spherical coordinates is made possible.

As shown in FIG. 7, a scale 72 for spherical coordinates is constructed by forming a two-dimensional angular grid 71 on the inner surface of a spherical body 70. The position of a moving object can be determined by three angle sensors 73 provided on a moving object. Further, minute oscillations in three directions at the center of rotation can be sensed by sensing the attitude of a rotating object in three directions at the center of the spherical body 70.

Figure 8:
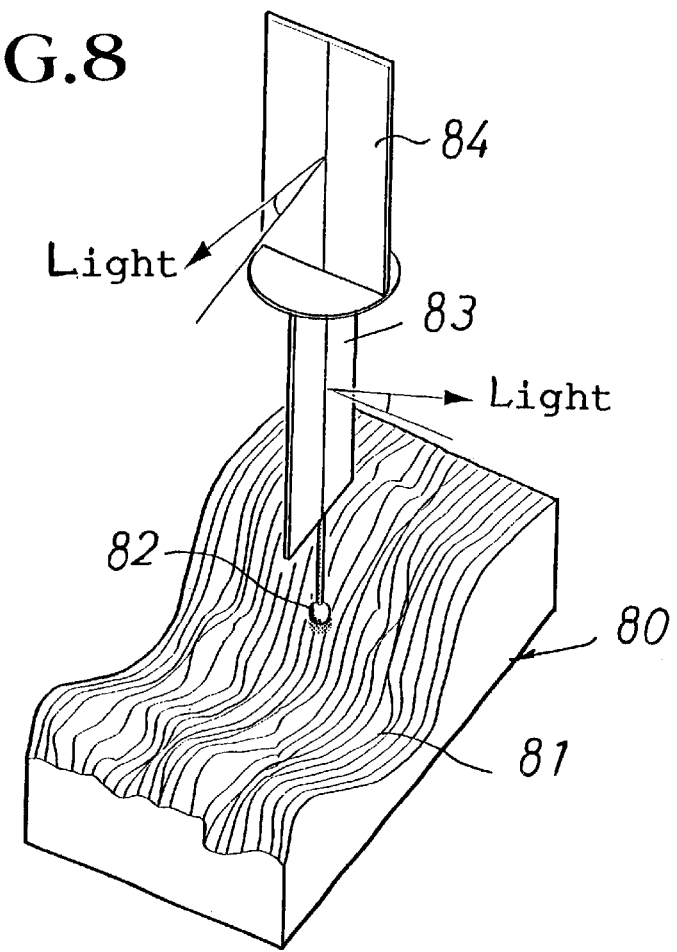
FIG. 8 is a fundamental view in which, according to an eighth embodiment of the present invention, a two-dimensional position sensing apparatus based upon a contact-type two-dimensional sensor and a microgrid is constructed using the principle of a sensor in a microscope that employs interatomic force.

FIG. 8 is a fundamental view in which, according to an eighth embodiment of the present invention, it is possible to perform two-dimensional positioning by constructing a contact-type angle sensor utilizing the principle of a sensor in a microscope that employs interatomic force, and adopting a microgrid such as a crystal as the angular grid.

As shown in FIG. 8, a crystal surface 81 of a crystal 80 is utilized as a two-dimensional angular grid for a scale. A contactor 82 has its position on the crystal surface 81 decided by the interatomic force of the crystal or by contact pressure, and microlevers 83, 84 for two directions are successively connected to the contactor 82. The flexure of the microlevers 83, 84 varies depending upon the direction of the surface normal line at the point of contact. The microlevers 83, 84 are irradiated with light from light sources (not shown), and the direction of light reflected from the microlevers 83, 84 is sensed by optical sensors such as a semiconductor light-position sensor. This makes it possible to sense a change in the angular shape and to achieve positioning in two dimensions.

In this embodiment, the alignment of the atoms of the crystal surface 81 can be utilized as the two-dimensional angular grid for the scale.

It should be noted that another sensor for sensing a fundamental change may be used instead of the light sensor for sensing flexure of the microlevers 83, 84, and that strain gauges may be affixed to the microlevers.

The present invention is not limited to the arrangements described in the foregoing embodiments.

By way of example, an arrangement may be adopted in which the angular change of the angular grid has a form obtained by superimposing a plurality of sine waves having different frequencies.

Further, the angular grid may be implemented utilizing a change in refractive index brought about by a change in the composition of a material within a transparent plate. The angular grid may employ a material the refractive index of which is changed by an externally applied electromagnetic or mechanical force. The material may be used alone or sealed within a vessel.

Further, the scale of the present invention may be constructed by causing an angular grid surface, whose angle-related property varies in the form of a known function, to be produced by standing waves obtained when a periodic excitation force is applied to a resilient plate, a planar surface having a resilient property, a crystal body or a liquid surface, wherein the angular grid is produced on or in the surface.

Further, according to the present invention, the scale may be constructed from a plurality of divided scales each having an angular grid, wherein a plurality of the divided scales can be arrayed intermittently or continuously in conformity with the area over which a moving object moves. An arrangement can be adopted in which, rather than increasing the number of angular grid surfaces, plural sets of angle sensors having the same function are deployed at intervals smaller than the size of the angular grid surface.

Further, according to the present invention, means may be provided for applying a fixed amount of relative motion to an angle sensor along the x and y directions of the angular grid, and calculating data for calibrating error from the known ideal shape of the angular grid based upon each detection value from the angle sensor before and after relative movement and the difference between the values. Further, it is permissible to adopt an arrangement having storage means for storing the calculated calibration data or calibration data obtained by an ordinary comparison calibration, and correction means for correcting, on the basis of the calibration data, results of measuring positional coordinates and various attitude angles by the angular grid.

Further, the present invention can be adapted to generate traveling waves, form an angular grid in which a uniform change in the surface whereof is produced by the standing waves, and determine position two-dimensionally based upon a relationship between the angular grid and time.

In the present invention, an arrangement may be adopted in which the angular grid is so adapted as to apply electromagnetic power to an electro-optic crystal or a liquid that fills the interior of a vessel and reacts to electromagnetic force or light, thereby subjecting the electro-optic crystal or liquid to a change in refractive index, wherein the change is in the form of a known function.

The present invention exhibits a number of outstanding effects.

Specifically, in accordance with the present invention as described above, the scale used to sense the position or various attitudes of a moving object is formed from a two-dimensional angular grid representing an angular shape. As a result, the two-dimensional position of a moving object can be sensed as a matter of course, and so can the pitching angle, rolling angle and yawing angle of the moving object, merely by combining angle sensors with a simple scale. In addition, by adopting the angular grid as the scale, it is possible to sense position relating to two-dimensional coordinates such as orthogonal coordinates, cylindrical coordinates, polar coordinates or coordinates along a freely curved surface.

Further, by combining at least one two-dimensional angle sensor with a scale comprising a two-dimensional angular grid, the position of a moving object in two-dimensional coordinates can be sensed in relative movement between the scale and the angle sensor. If the angle sensor is subjected to a known change in attitude, such as a change in pitching angle or rolling angle, the distance between the scale and angle sensor can also be sensed at the same time.

Further, in accordance with the present invention, combining at least one pair of two-dimensional angle sensors with a scale comprising a two-dimensional angular grid makes it possible to sense the position of a moving object in two-dimensional coordinates, as well as the pitching and rolling angles of the moving object, in relative movement between the scale and the angle sensors. If the angle sensor is subjected to a known change in attitude, such as a change in pitching angle or rolling angle, the distance between the scale and angle sensors can also be sensed at the same time.

Further, in accordance with the present invention, combining at least three two-dimensional angle sensors with a scale comprising a two-dimensional angular grid makes it possible to sense the position of a moving object in two-dimensional coordinates, as well as the pitching, rolling and yawing angles of the moving object, in relative movement between the scale and the angle sensors. In addition, by subjecting the angle sensors to a known prescribed change in angle, the distance between the scale and angle sensors can also be sensed.

Further, in accordance with the present invention, position along one axis, pitching angle and rolling angle can be sensed by combining at least one pair of angle sensors with a scale constructed from an angular grid which varies along one axis (the x axis) in the form of a known function.

Further, in accordance with the present invention, it is possible to sense position precisely by adopting an arrangement in which the angular variation of the angular grid has a form obtained by superimposing a plurality of sine waves having different frequencies.

Further, in accordance with the present invention, the angle sensor is constructed from a plurality of displacement meters arrayed with a prescribed spacing among them, wherein the displacement meters are of optical type, a type which senses an electro-optic quantity or of mechanical-contact type. By sensing a quantity corresponding to a change in the angle of inclination of the shape of the angular grid surface, which change has been applied by a differential output from the displacement meters in the form of a change in height and shape, this sensed quantity can be utilized instead of angle information. If three or more displacement meters are arranged two-dimensionally with prescribed distances between them, the displacement meters can function as a two-dimensional angle sensor.

Further, in accordance with the present invention, the scale is capable of forming an angular grid surface, whose angle-related property varies spatially, by standing waves obtained when periodic oscillation is applied to a resilient plate, a planar surface or curved surface having a resilient property, a crystal body, a liquid surface of a liquid filling a hermetically sealed vessel, wherein the angular grid is produced on or in the surface. The scale can be utilized as the scale surface only while the oscillation is being applied.

Further, in accordance with the present invention, the scale is constructed from a plurality of divided scales each having an angular grid surface, wherein a plurality of the divided scales are arrayed intermittently or continuously in conformity with the area over which the moving object moves. As a result, even if the angle sensor departs, in relative terms, from one angular grid surface, information indicative of the position of the angular grid surface of the adjacent divided scale can be sensed. This makes it possible to enlarge the range of relative movement between the angle sensor and the angular grid.

Further, in accordance with the present invention, correction means is provided for correcting, based upon results of calibrating an error in the angular shape of the angular grid, results of measuring coordinate position and attitude angles by the angular grid. Accordingly, in situations where the angular grid cannot be fabricated to a high precision, the calibration data is stored in memory beforehand and data between known items of data is approximated by interpolation, thereby making it possible to correct measurement data based upon results of calibration.

Further, in accordance with the present invention, a deviation from the ideal shape of an angular grid can be calibrated autonomously by applying a known amount of motion to an angle sensor. This makes it possible to compensate for the error component when the accuracy of the angular grid is poor.

As many apparently widely different embodiments of the present invention can be made without departing from the spirit and scope thereof, it is to be understood that the invention is not limited to the specific embodiments thereof except as defined in the appended claims.

What is claimed is:

1. A sensing apparatus for sensing position of a moving object, comprising:

a scale comprising an angular grid, wherein the grid is formed on or in a surface of a scale substrate, wherein the substrate includes a planar surface and a freely curved surface, and wherein a slope of the angular grid varies in two different directions (x and y directions) in a form of a known function; and at least one two-dimensional angle sensor confronting the surface of said scale having the grid, the sensor being capable of sensing angles along each of the x and y directions;

one of said scale and said angle sensor being attachable to a moving object and a position of the moving object in two-dimensional coordinates being detectable by relative movement between said scale and said angle sensor;

wherein an angular variation of said angular grid is implemented in a form obtained by superimposing a plurality of sine waves having different frequencies.

2. An apparatus as claimed in claim 1, wherein the position of the moving object along one axial direction (direction of movement) and a pitching angle of the moving object are sensed by a two-point method from an angle of inclination along the one axial direction of the angular grid, wherein the two-point method relates to an angularly shaped function, and wherein the position and the pitching angle are sensed by a pair of angle sensors arranged with a prescribed distance between them along the one axial direction of said angular grid.

3. The apparatus according to claim 1, wherein said angle sensor comprises a plurality of displacement meters arrayed with a prescribed spacing, wherein said displacement meters are of optical type, of a type which senses an electro-optic quantity, or of mechanical-contact type, a differential output from two mutually adjacent displacement meters serving as the output of said angle sensor.

4. The apparatus according to claim 1, wherein the angle sensor is made to function as a distance sensor by applying a rotational angle of a known direction and known magnitude to said angle sensor, wherein a distance between the angular grid surface of said scale and said angle sensor or an amount of change in said distance is capable of being sensed in relative movement between said angular grid and said angle sensor.

5. The apparatus according to claim 1, wherein said scale is constructed by causing the angular grid to be produced by standing waves obtained when periodic oscillation is applied to a resilient plate, the planar surface or the curved surface having a resilient property, a crystal body, a liquid surface, or a liquid filling a hermetically sealed vessel, wherein a slope of the angular grid varies in a form of a known function.

6. The apparatus according to claim 1, wherein said scale comprises a plurality of divided scales each having an angular grid surface, and the plurality of said divided scales are arrayed intermittently or continuously in conformity with an area over which the moving object moves.

7. The apparatus according to claim 1, wherein traveling waves are generated, and wherein the traveling waves produce the angular grid, and the position in two dimensions is determined based upon a relationship between the angular grid and time.

8. The apparatus according to claim 5, further comprising means for correcting, based upon results of calibrating an error in an angular shape of said angular grid, results of measuring coordinate position and attitude angle by said angular grid.

9. An apparatus as claimed in claim 1, wherein the scale and the angle sensor are separated by a distance, and wherein the distance can be sensed when the angle sensor is subjected to a known change in attitude.

10. An apparatus as claimed in claim 9, wherein the change in attitude is a change in pitching angle or rolling angle.

11. An apparatus as claimed in claim 1, wherein the two-dimensional coordinates comprise orthogonal coordinates, cylindrical coordinates, polar coordinates, or coordinates along the freely curved surface.

12. An apparatus as claimed in claim 1, wherein the angle sensor senses an angle of inclination of an inclined surface of the scale.

13. An apparatus as claimed in claim 12, wherein the angle sensor is an optical sensor.

14. An apparatus as claimed in claim 1, wherein the angle sensor irradiates the angular grid with emitted light rays; wherein the angular grid reflects the emitted light rays in a direction; and wherein the angle sensor senses, along the x and y axes, the direction of the reflected light rays.

15. The apparatus according to the claim 1, wherein said angular grid comprises a multiplicity of peaks and valleys of a fixed amplitude, the angular grid varying sinusoidally in two intersecting directions on or in the surface of said substrate.

16. The apparatus according to the claim 1, wherein said angular grid is so adapted as to apply electromagnetic or optical power to an electro-optic crystal or to a liquid that fills an interior of a vessel and reacts to electromagnetic force or light, thereby subjecting said electro-optic crystal or liquid to a change in refractive index, wherein the change is in a form of a known function.

17. The scale according to claim 1, wherein said angular grid has orthogonal coordinates, cylindrical coordinates, polar coordinates, or coordinates along the freely curved surface.

18. A sensing apparatus for sensing position and various attitudes of a moving object, comprising:

a scale comprising an angular grid, wherein the grid is formed on or in a surface of a scale substrate, wherein the substrate includes a planar surface and a freely curved surface, and wherein a slope of the angular grid varies in two different directions (x and y directions) in a form of a known function; and at least one pair of two-dimensional angle sensors confronting the surface of said scale having the grid, the sensors being spaced apart from each other by prescribed distances along the x and y directions;

one of said scale and said angle sensor being attachable to a moving object and a position of the moving object in two-dimensional coordinates being detectable by relative movement between said scale and said angle sensor;

wherein an angular variation of said angular grid is implemented in a form obtained by superimposing a plurality of sine waves having different frequencies.

19. An apparatus as claimed in claim 18, wherein the scale is a two-dimensional angular grid, wherein the scale and the angle sensors are separated by a distance, and wherein the distance can be sensed when the angle sensor is subjected to a known change in attitude.

20. An apparatus as claimed in claim 19, wherein the change in attitude is a change in pitching angle or rolling angle.

21. An apparatus as claimed in claim 18, wherein the pair of two-dimensional angle sensors comprises a first two-dimensional angle sensor and a second two-dimensional angle sensor; wherein the first and second angle sensors irradiate the angular grid with emitted light rays; wherein the angular grid reflects the emitted light rays in a direction;

wherein the first and second angle sensors sense, along the x and y axes, the direction of the reflected light rays; wherein the first and second angle sensors are spaced apart from each other by dx along the x axis and by dy along the y axis; and wherein the first angle sensor senses an angle of inclination along the x and y axes at a position given by coordinates (x, y); and wherein the second angle sensor senses an angle of inclination along the x and y axes at a position given by coordinates (x+dx, y+dy).

22. An apparatus as claimed in claim 18, wherein the position of the moving object along one axial direction (direction of movement) and a pitching angle of the moving object are sensed by a two-point method from an angle of inclination along the one axial direction of the angular grid, wherein the two-point method relates to an angularly shaped function, and wherein the position and the pitching angle are sensed by a pair of angle sensors arranged with a prescribed distance between them along the one axial direction of said angular grid.

23. A sensing apparatus for sensing position and various attitudes of a moving object, comprising:
    a scale comprising by an angular grid, wherein the grid is formed on or in a surface of a scale substrate, wherein the substrate includes a planar surface and a freely curved surface, and wherein a slope of the angular grid varies in two different directions (x and y directions) in a form of a known function; and
    at least three two-dimensional angle sensors confronting the surface of said scale having the grid, the sensors being spaced apart from each other by prescribed distances along the x and y directions;
    one of said scale and said angle sensors being attachable to a moving object and a position of the moving object in two-dimensional coordinates as well as pitching, rolling angle and yawing angle of the moving object being detectable by relative movement between said scale and said angle sensor;
    wherein an angular variation of said angular grid is implemented in a form obtained by superimposing a plurality of sine waves having different frequencies.

24. An apparatus as claimed in claim 23, wherein the scale is a two-dimensional angular grid, wherein the scale and the angle sensors are separated by a distance, and wherein the distance can be sensed when the angle sensors are subjected to a known change in attitude.

25. An apparatus as claimed in claim 24, wherein the change in attitude is a change in pitching angle or rolling angle.

26. An apparatus as claimed in claim 23, wherein the position of the moving object along one axial direction (direction of movement) and a pitching angle of the moving object are sensed by a two-point method from an angle of inclination along the one axial direction of the angular grid, wherein the two-point method relates to an angularly shaped function, and wherein the position and the pitching angle are sensed by a pair of angle sensors arranged with a prescribed distance between them along the one axial direction of said angular grid.

27. A sensing apparatus for sensing position or various attitudes of a moving object, comprising:
    a scale comprising an angular grid, wherein the grid is formed on or in a surface of a scale substrate, wherein the substrate includes a planar surface and freely curved surface, and wherein a slope of the angular grid varies along one axial direction (the x direction) in a form of a known function; and
    an angle sensor confronting the surface of said scale having the grid;
    one of said scale and said angle sensor being attachable to a moving object, and a position of the moving object along the one axial direction being detectable by relative movement between said scale and said angle sensor;
    wherein the position of the moving object alone one axial direction (direction of movement) and a pitching angle of the moving object are sensed by a two-point method from an angle of inclination along the one axial direction of the angular grid, wherein the two-point method relates to an angularly shaped function, and wherein the position and the Ditching angle are sensed by a pair of angle sensors arranged with a prescribed distance between the pair of angle sensors along the one axial direction of said angular grid.

28. An apparatus for sensing a moving object as claimed in claim 27, wherein the angle sensor comprises a two-dimensional angle sensor for sensing a variation along one axial direction (direction of movement) and a variation along a direction at right angles to said direction of movement, the position along the one axial direction as well as the pitching angle and a rolling angle being sensed by this angle sensor.

29. The apparatus according to claim 28, wherein an angular variation of said angular grid is implemented in a form obtained by superimposing a plurality of sine waves having different frequencies.

30. The apparatus according to claim 27, wherein an angular variation of said angular grid is implemented in a form obtained by superimposing a plurality of sine waves having different frequencies.

31. An apparatus as claimed in claim 27, wherein the pair of angle sensors comprise two-dimensional angle sensors for sensing angles in both the x and y directions, and wherein if an angle of the angular grid in the y direction is known, then a rolling angle re(x) of the moving object can be sensed from the y-direction angle output of the angle sensor.

32. A sensing apparatus for sensing position of a moving object, comprising:
    a scale comprising an angular grid, wherein the grid is formed on or in a surface of a scale substrate, wherein the substrate includes a planar surface and a freely curved surface, and wherein a slope of the angular grid varies in two different directions (x and y directions) in a form of a known function; and
    at least one two-dimensional angle sensor confronting the surface of said scale having the grid, the sensor being capable of sensing angles along each of the x and y directions;
    one of said scale and said angle sensor being attachable to a moving object and a position of the moving object in two-dimensional coordinates being detectable by relative movement between said scale and said angle sensor;
    the sensing apparatus further comprising:
        a means for applying a fixed amount of relative motion to said angle sensor along the x and y directions of said angular grid, and calculating data for calibrating error from a known ideal shape of the angular grid based upon each detection value from the angle sensor before and after relative movement and a difference between the values; and
        a storage means for storing the calibration data calculated.

33. An apparatus for sensing position comprising:
a scale comprising:
   a surface; and
   a grid on or in the surface, wherein the grid is defined by a known function in three dimensions; and
   an angle sensor for determining position, wherein the angle sensor determines a position of the scale or sensor by sensing an angle formed between a direction of a medium before the direction is changed by the grid and a direction of the medium after the direction is changed by the grid.

34. The apparatus as claimed in claim 33, wherein the medium passes through the grid or reflects from the grid.

35. The apparatus as claimed in claim 33, wherein different parts of the grid refract the medium passing through the grid at different angles.

36. The apparatus as claimed in claim 33, wherein different parts of the grid reflect the medium at different angles.

37. The apparatus as claimed in claim 33, wherein the angle sensor senses the angle formed between a direction of the medium before the direction is changed by the grid and a direction of the medium after the direction is changed by the grid as the angle sensor and the scale move relative to each other.

38. An apparatus as claimed in claim 37, wherein the angle sensor comprises at least two angle sensors.

39. An apparatus as claimed in claim 37, wherein the angle sensor comprises at least three angle sensors.

40. The apparatus as claimed in claim 33, wherein the grid comprises a plurality of peaks and valleys of fixed amplitude varying sinusoidally in intersecting directions.

41. The apparatus as claimed in claim 33, wherein the position of the scale is determined relative to the sensor or the position of the sensor is determined relative to the scale.

42. The apparatus as claimed in claim 33, wherein the scale or the angle sensor is attachable to a moving object, and wherein determining the position of the scale or sensor results in determining the position of the moving object.

43. The apparatus as claimed in claim 33, wherein the angle sensor comprises at least two angle sensors.

44. The apparatus as claimed in claim 43, wherein the position and a pitching angle are determined from outputs of the two angle sensors.

45. The apparatus as claimed in claim 44, wherein at least one angle sensor is a two-dimensional angle sensor, and wherein the sensor senses the position, the pitching angle, and a rolling angle.

46. The apparatus as claimed in claim 33, wherein the angle sensor comprises at least three angle sensors.

47. The apparatus as claimed in claim 33, wherein the angular grid is defined by a function in one direction.

48. The apparatus as claimed in claim 33, wherein the angular grid is defined by a known function in two directions.

49. The apparatus as claimed in claim 33, wherein the known function is a plurality of sinusoids of varying frequencies.

50. The apparatus as claimed in claim 33, wherein the known function represents a plurality of standing or traveling waves.

51. The apparatus as claimed in claim 33, further comprising a means for correcting a sensed position.

52. The apparatus as claimed in claim 33, further comprising:
   a means for calculating calibration data; and
   a means for storing calibration data.

53. An apparatus as claimed in claim 33, wherein the grid is an angular grid, and wherein the angular grid is formed by applying electromagnetic power of a known function to an electro-optic crystal or a liquid.

54. An apparatus as claimed in claim 33, wherein the grid is an angular grid, and wherein the angular grid has coordinates.

55. A sensing apparatus for sensing position of a moving object, comprising:
   a scale comprising an angular grid, wherein the grid is formed on or in a surface of a scale substrate, wherein the substrate includes a planar surface and a freely curved surface, and wherein a slope of the angular grid varies in two different directions (x and v directions) in a form of a known function; and
   at least one two-dimensional angle sensor confronting the surface of said scale having the grid, the sensor being capable of sensing angles along each of the x and v directions;
   one of said scale and said angle sensor being attachable to a moving object and a position of the moving object in two-dimensional coordinates being detectable by relative movement between said scale and said angle sensor;
   wherein a fixed amount of known relative motion is applied to the angle sensor in the x and y directions of the angular grid then, based upon each detection value from the angle sensor before and after relative movement and the difference between these values, data for calibrating deviation from a known ideal shape of the angular grid can be obtained.

* * * * *